United States Patent [19]
Kluver et al.

[11] 3,836,242
[45] Sept. 17, 1974

[54] MICRO FICHE MOUNTING CARRIAGE FOR FILM READER

[75] Inventors: Dennis A. Kluver, Minneapolis; Donald N. Mehl, Minnetonka, both of Minn.

[73] Assignee: Northwest Microfilm Inc., Minneapolis, Minn.

[22] Filed: Apr. 9, 1973

[21] Appl. No.: 349,070

[52] U.S. Cl. .................................. 353/27, 353/78
[51] Int. Cl. .......................................... G03b 23/08
[58] Field of Search ............... 353/27, 74, 119, 78; 33/1 M, 189, 180, 23 C

[56] References Cited
UNITED STATES PATENTS

| | | | |
|---|---|---|---|
| 1,142,585 | 6/1915 | Lane | 33/23 C |
| 2,608,907 | 9/1952 | Ivins et al. | 33/23 C |
| 3,442,581 | 5/1969 | Smitzer et al. | 353/27 |
| 3,733,121 | 5/1973 | Smitzer | 353/78 |
| 3,743,399 | 7/1973 | Smith | 353/27 |

Primary Examiner—Louis R. Prince
Assistant Examiner—Willis Little
Attorney, Agent, or Firm—John W. Adams

[57] ABSTRACT

This is a micro fiche film mounting carriage for a film reader and constitutes a base member having a roller track integrally extruded therewith to permit a mounting carriage to be moved on one axis with a second roller track mounted thereon for movement on an axis disposed at right angles thereto.

7 Claims, 3 Drawing Figures

FIG.1

MICRO FICHE MOUNTING CARRIAGE FOR FILM READER

It has been a constant problem with micro fiche viewers or readers to provide a simple easily operated mounting for micro fiche film so that the film may be quickly and easily positioned under the viewing lens to permit the information contained in said film to be projected on to the reader screen.

It is an object of the present invention to provide a roller and roller track assembly particularly designed for use with micro fiche film mounting carriages for a micro fiche reader and specifically constructed to capture in close tolerance relation the grooved carriage rollers to provide a simple easily assembled carriage and track construction which will produce substantially reduced resistence to adjustable positioning thereof as compared to prior art mounting systems.

More specifically it is an object to provide a base structure for a micro fiche film reader which is specifically designed to permit construction thereof by aluminum extrusion and provide extremely accurate location of a pair of base roller tracks as an integrally extruded portion thereof to permit easy movement of the micro fiche film carrier on one of its two axes, movement on the other axis being provided by a transverse roller and track assembly mounted on said base tracks.

It is another object to provide an easily accessible removable tray mounted in said base and carrying all of the electrical components to facilitate servicing thereof.

These and other objects and advantages of this invention will more fully appear in the following description made in connection with the accompanying drawings in which like reference characters refer to similar parts throughout the several views, and, in which:

FIG. 1 is a central longitudinal vertical sectional view showing a micro fiche film reader embodying this invention;

Figure 2:
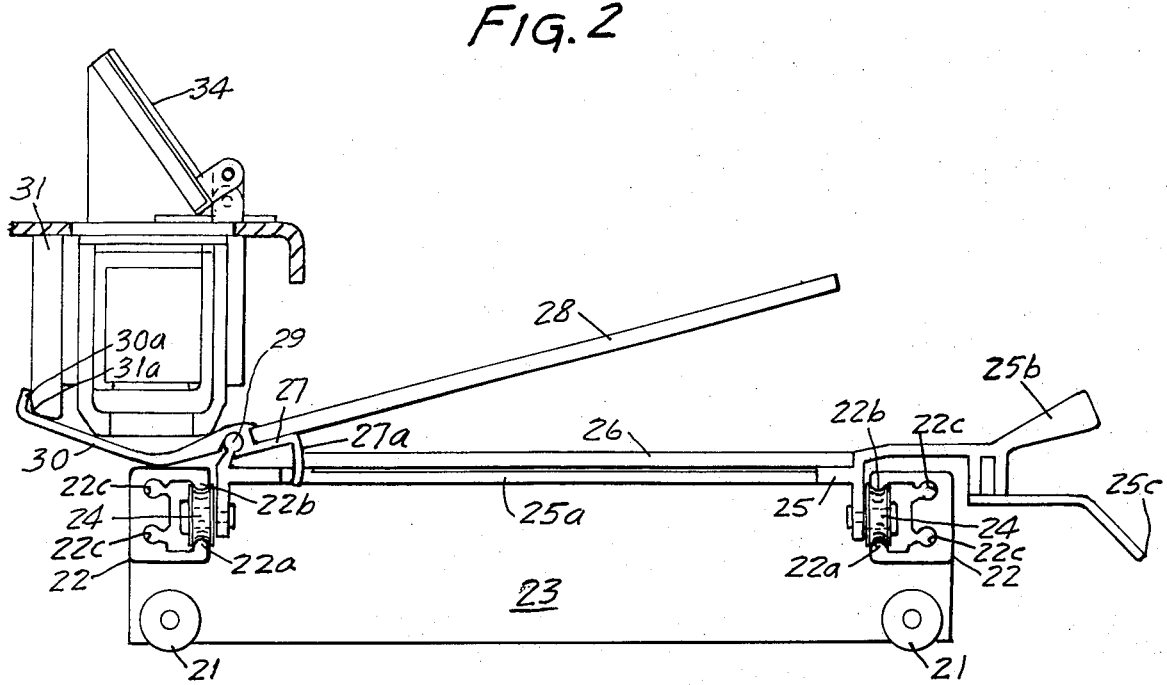
FIG. 2 is a similar sectional view of the upper carriage and track assembly drawn to a larger scale.
Figure 3:
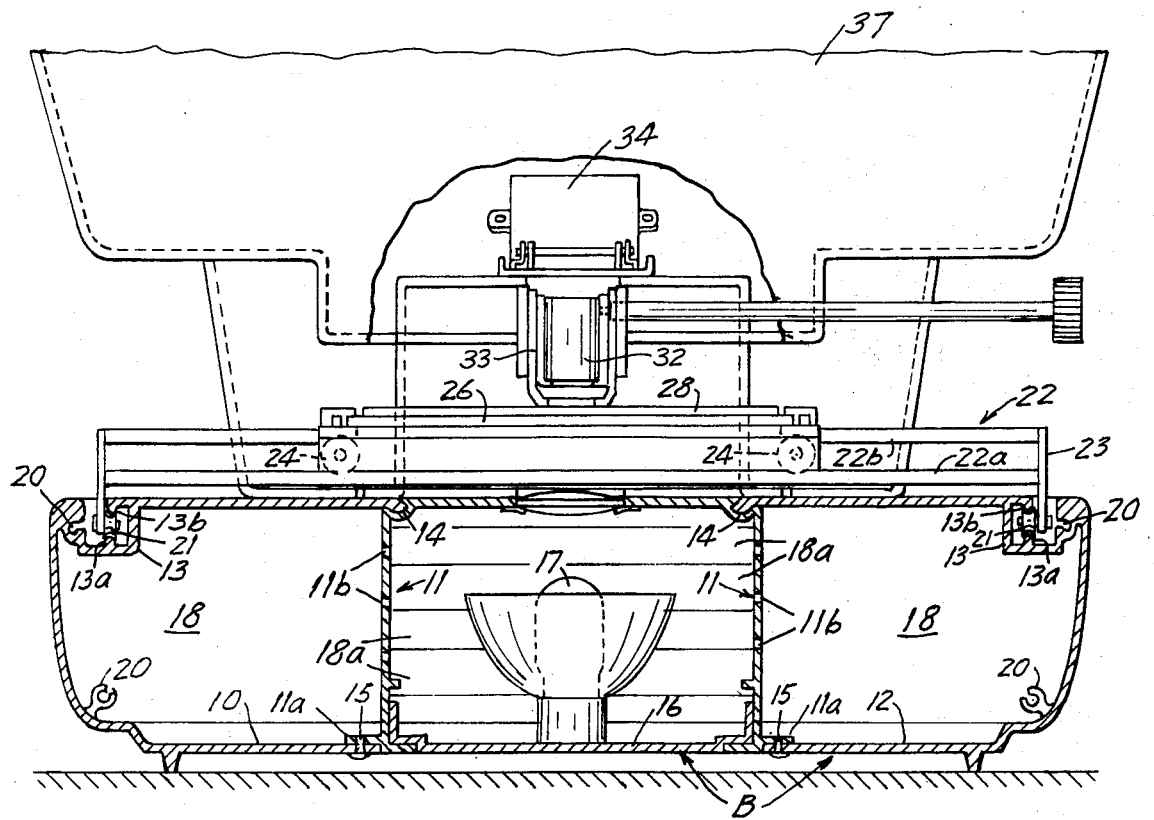
FIG. 3 is a central transverse sectional view of the reader shown in FIG. 1.

A base unit B is produced in three extruded sections 10, 11 and 12. The two side sections 10 and 12 are symetrically designed so that a single extrusion die may be used to produce both extruded units. A pair of base roller tracks 13 are respectively formed in the upper portions of the two side sections 10 and 12. Each of said roller tracks has a pair of vertically opposed rails 13a and 13b each having convexly rounded roller engaging and capturing surfaces.

The sections 10, 11 and 12 have interlocking connecting elements 14 formed in the upper portions thereof and the lower portions are rigidly connected by connecting screws 15 extending through the bottom portion of the side sections 10 and 12 and into connecting flanges 11a formed on the lower portions of the sides of the section 11. A tray member 16 is slideably mounted in the bottom of the center base section 11 and carries an electric light 17 and other suitable components for controlling the light intensity, reducing the line voltage and the like as may be desired. All of the electrical components are mounted on the tray 16 which may be easily and quickly removed for maintenance and service of said components. In order to provide sufficient cooling for the light chamber a fan is provided which is mounted in the rear portion of the tray and idscharges through a louvre 18a provided in the back closure panel 18 behind the center base section 11. A front closure panel 19 is connected across the front of the assembled base sections as by attachment screw members extending therethrough into suitable screw ports 20 provided in the side sections 10 and 12. The side portions of the front panel 19 have louvres (not shown) provided therein and the upstanding sides of the center section 11 are provided with air flow passages 11b to permit the air to be circulated through the center light chamber by said fan.

The mounting carriage assembly for the micro fiche film has two units. The first carriage unit is mounted for sliding movement on grooved rollers 21 on which are mounted a pair of transverse track members 22. A pair of end plates 23 are fixed to the ends of tracks 22 as by screws threadably inserted in the screw ports 22c in the ends of said track members 22. The end plates 23 provide the spacing and connecting means between said track members 22 and connect the same to the rollers 21. Each track 22 is formed by an extruded member and includes a pair of rails 22a and 22b. These rails are similar to the rails 13a and 13b and receive roller elements 24 which are similar to and interchangeable with rollers 21 to facilitate construction and servicing of the carriage unit.

Figure 1:
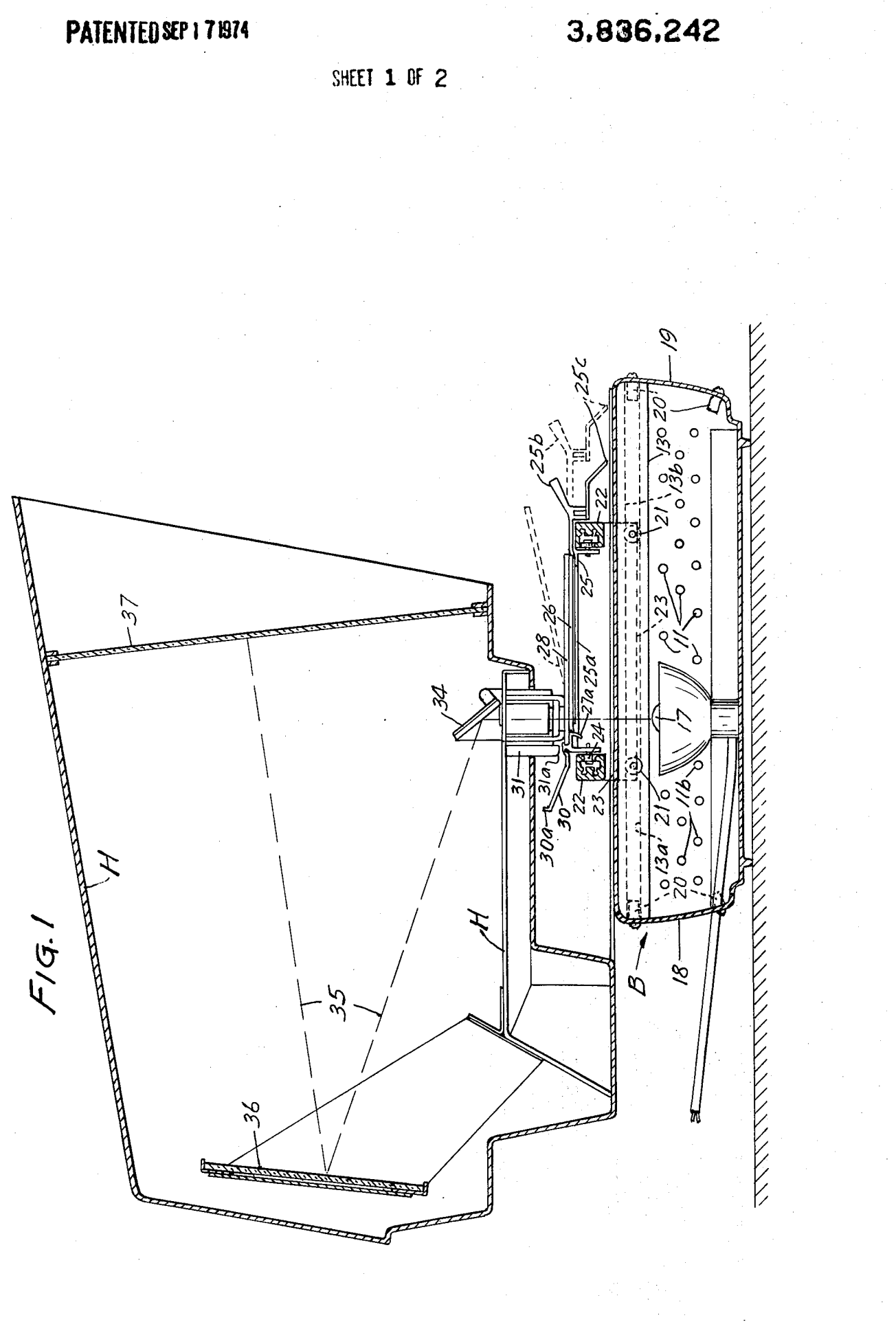

A suitable lower glass mounting frame 25 is mounted on the rollers 24 and has a cut out center portion 25a as best shown in FIG. 1. A bottom glass member 26 is fixed across said opening 25a and a hinged or pivoted mounting member 27 supports an upper glass member 28 which is adapted to be raised as shown in FIG. 2 and by the dotted lines of FIG. 1. This permits insertion of a micro fiche film sheet between the two glass members. The tray 16 is removable from the rear of the center base section 11 and the closure panel 18 has a removable center portion which is connected to the rear end of the tray 16 for removal therewith.

The upper glass mounting member 27 is pivotally mounted on a fulcrum bar 29 which is fixed to the glass mounting frame 25 as best shown in FIGS. 1 and 2. The member 27 has a fulcrum receiving groove into which the fulcrum 29 is received. An elevating lever 30 extends rearwardly of the upper carriage and slopes upwardly above the elevation of the upper glass 28. A fixed camming member 31 extends downwardly from the bottom of the screen housing H and when the carriage assembly is moved forwardly on the main tracks 13 the camming lever 30 engages the lower camming edge 31a of the depending camming bar 31 to raise the mounting member 27 and glass 28 into the position shown in FIG. 2 and the dotted position shown in FIG. 1. A stop hook 30a limits the forward movement of the carriage by engagement of the camming bar 31. The mounting member 27 has a glass receiving groove disposed slightly forwardly of the fulcrum receiving groove identified above and the rear edge of the upper glass 28 is received in this groove and is securely attached to the top of the mounting member 27 as by being adhesively secured thereto. The glass 28 is thus cantilever supported from its rear marginal edge portion which is secured to the mounting member 27 as described above. A depending micro fiche film stop 27a engages the rear edge of a film sheet inserted between the upper and lower glass members where the upper glass is raised as shown in FIG. 2.

A suitable handle 25b is provided for moving the carriage into the desired position and a pointer 25c indicates the area of the portion of the film being projected. A suitable lens unit is mounted in a lens sleeve 32 which is removably inserted into a housing member 33. A screen housing H is mounted in fixed relation above said base B and a mirror 34 reflects the image transmitted by the lens structure rearwardly within the screen housing H as indicated by the dotted line 35 in FIG. 1.

A second mirror 36 is mounted in fixed relation in the back portion of housing H and projects the image on to a viewing screen 37 of conventional material and design. The mirror 34 is hinged to permit removal of the lens mounting sleeve 32 and facilitates changing lens units.

It will be seen that I have provided a simple and easily constructed mounting carriage for micro fiche film sheets specifically adapted for use with micro fiche readers. This carriage is particularly constructed to permit precise and easy movement thereof on both axes.

It will, of course, be understood that various changes may be made in the form, details, arrangement and proportions of the parts without departing from the scope of this invention as set forth in the appended claims.

What is claimed is:

1. In a micro fiche reader which includes a light source, a lens spaced from said light source, a viewing screen and means for projecting an image on said viewing screen; a film mounting carriage assembly comprising:

an extruded aluminum base structure including a pair of lower main carriage tracks integrally formed with the respective side portions of said base structure and each of said tracks having a pair of opposed upper and lower roller-confining rails, a first carriage unit having rollers mounted between the rails of said main tracks and confined thereby for back and forth movement therein and including a pair of transverse track members extending between said rollers, each of said transverse track members having a pair of opposed upper and lower roller-confining rails, a second carriage having rollers mounted between the upper and lower roller confining rails of said transverse track members which extend between said first carriage rollers, said second carriage being movable along said transverse track members, a film mounting frame positioned between the light source of the reader and the lens and mounted on said second carriage and including a bottom glass member rigidly fixed to said second carriage and a top glass member mounted to be raised from said bottom glass member for inserting a micro fiche film sheet therebetween, and means for clamping said film sheet between said glass members during operation of the reader.

2. The structure set forth in claim 1 and said base structure including a pair of symetrical side section extrusions each having one of said carriage tracks integrally formed therewith and a center base structure section rigidly connected between said side sections.

3. The structure set forth in claim 1 and said track rails having convexly curved opposed track engaging surfaces, and said rollers having grooves therein conforming to the curvature of said rails and captured in close fitting relation therebetween.

4. The structure set forth in claim 1 and a removable tray supported in the bottom of said base structure, with the light unit mounted thereon to facilitate servicing.

5. The structure set forth in claim 1 and camming means attached to said top glass to raise the same when the carriage is shifted into extreme forward position on said main tracks.

6. The structure set forth in claim 1 and the front and back of said base structure having closure panels attached thereto to close the ends of said base structure and said main tracks to confine the main track rollers.

7. The structure set forth in claim 1 and a pair of end plates connecting said second track members together and also to said main rollers.

* * * * *